Sept. 21, 1954  E. D. LYTLE  2,689,919
AUTOMATIC SYNCHRONIZING SYSTEM
Filed May 25, 1953  3 Sheets-Sheet 1

ELVIN D. LYTLE,
INVENTOR.

BY John H.Y. Wallace

Sept. 21, 1954  E. D. LYTLE  2,689,919
AUTOMATIC SYNCHRONIZING SYSTEM

Filed May 25, 1953  3 Sheets-Sheet 2

ELVIN D. LYTLE,
INVENTOR.

BY John H. J. Wallace

Sept. 21, 1954     E. D. LYTLE     2,689,919

AUTOMATIC SYNCHRONIZING SYSTEM

Filed May 25, 1953     3 Sheets-Sheet 3

ELVIN D. LYTLE,
INVENTOR.

BY *John H. J. Wallace*

Patented Sept. 21, 1954

2,689,919

UNITED STATES PATENT OFFICE 2,689,919

AUTOMATIC SYNCHRONIZING SYSTEM

Elvin D. Lytle, Los Angeles, Calif., assignor to The Garrett Corporation, Los Angeles, Calif., a corporation of California Application May 25, 1953, Serial No. 357,145

12 Claims. (Cl. 307—87)

This invention relates generally to control systems, and particularly relates to an electric system for automatically paralleling or synchronizing two single-phase or polyphase alternating-current sources.

In order to avoid damage to the electrical system two alternating-current sources should be connected at an instant when the frequencies of the alternating voltages are substantially equal and the phase angle between the voltages substantially zero. It is also usually desirable that the amplitudes of the alternating voltages be equal when the sources are paralleled. To this end various synchronizing systems have been devised. Some of these systems are particularly adapted for power installations where generators developing very large currents must be paralleled. For the smaller aircraft electrical systems there is no need to switch very large alternating currents. However, on the other hand, an electrical synchronizing system for use in an aircraft should always be simple and of light weight.

Some of the prior art synchronizing systems make use of interlocking electromagnetic relays. Since it requires usually a few milliseconds for each relay to operate, a chain of interlocking relays requires a period of time until the source is switched, which is of the order of a cycle of a sixty-cycle alternating current. This period of time may vary with use or age of components and hence it is difficult to switch the generators at the exact instant of synchronism when interlocking relays are used. Other known control systems make use of vacuum tubes which may require maintenance and which may have to be replaced from time to time.

It is accordingly an object of the present invention to provide a novel control system for paralleling a pair of alternating-current sources such as single-phase or polyphase alternating-current generators.

A further object of the invention is to provide a simple, inexpensive, lightweight automatic synchronizing system for paralleling two alternating-current generators.

Another object of the invention is to provide an electrical control system for automatically paralleling single-phase or polyphase alternating-current generators when the frequencies are substantially equal, the phase angle between the voltages substantially zero, and when the combined amplitudes exceed a predetermined value, the control system of the invention requiring neither interlocking electromagnetic relays nor electron tubes and being particularly adapted for use in connection with aircraft electrical installations.

In accordance with the present invention two alternating current sources are paralleled by means of a rectifier network to which a low-pass filter network is coupled. An alternating current voltage from each of the sources is applied to the rectifier network, the two voltages being nominally 180° out of phase. The rectifier network output controls the relay for paralleling the two sources when the two voltages impressed on the rectifier network are 180° out of phase, when the beat frequency of the two voltages is smaller than a predetermined value determined by the filter network, and when the combined amplitudes of the two voltages exceeds a predetermined value. The synchronizing system of the invention may be applied to single-phase generators as well as to polyphase generators which may have Y-connected or delta-connected field windings. The low-pass filter network may be a resistance-capacitance network, an inductance-capacitance network or any other suitable low-pass filter.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
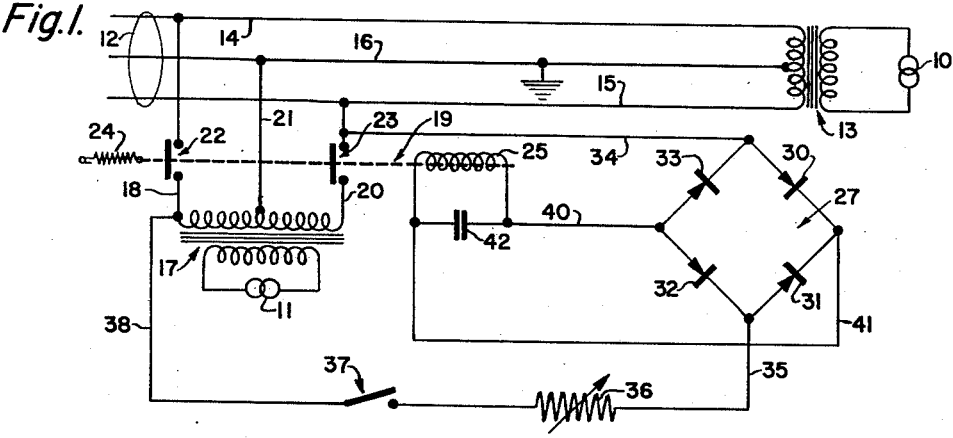
Fig. 1 is a circuit diagram of a system for automatically paralleling two single-phase alternating current lines embodying the present invention.

Referring now to the drawings in which like components have been designated by the same reference characters and particularly to Fig. 1, there is illustrated a synchronizing system including two alternating current generators schematically indicated at 10 and 11. The generator 10 is coupled to a three-wire line 12 through a transformer 13. The two busses 14 and 15 are connected to the terminals of the secondary winding of transformer 13 while the bus 16 is connected to the mid-point of the secondary winding. Bus 16 may be grounded as shown. The generator 11 is also coupled to a transformer 17. The terminals of the secondary winding of the transformer 17 are connected to conductors 18 and 20 while the mid-point of the secondary winding is connected through a conductor 21 to bus 16. Conductors 18 and 20 may be connected to busses 14 and 15 through respective movable contacts of switches 22 and 23 which are spring biased as schematically indicated at 24 into their open position. The movable contacts of the switches 22, 23 may be closed when a relay winding is energized.

The system of the present invention is provided with a mixer; shown as including a full-wave rectifier bridge network 27 including rectifiers 30, 31, 32 and 33. The bridge network 27 has an input circuit formed by a pair of leads 34 and 35. Lead 34 is connected to the bus 15 and accordingly alternating current voltage from the lower terminal of the secondary winding of transformer 13 is impressed on bridge network 27. Lead 35 is connected through a variable resistor 36, a control or master switch 37 and a lead 38 to the left-hand terminal of the secondary winding of transformer 17. Accordingly, when the master switch 37 is closed, an alternating current voltage from transformers 13 and 17 is impressed on the bridge network 27 and the two voltages impressed through leads 34 and 38 on the bridge network 27 are nominally 180° out of phase. This is due to the fact that the mid-points of the secondary windings of transformers 13 and 17 are interconnected through conductors 16, 21 so that opposite terminals of the two secondary windings are normally 180° out of phase.

The output circuit of bridge network 27 is formed by leads 40, 41 between which relay winding 25 is connected. A capacitor 42 is connected across relay winding 25. Resistor 36 and capacitor 42 form a resistance-capacitance, low-pass filter network. Resistor 36 is adjustable to adjust the voltage applied across relay winding 25.

Figure 2:
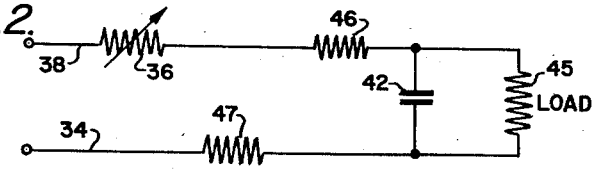
Fig. 2 is an equivalent circuit diagram of a rectifier bridge circuit and low-pass filter included in the system of Fig. 1.

Let it now be assumed that master switch 37 is closed. Accordingly, bridge network 27 is energized and a full-wave rectified voltage appears between output leads 40, 41. The rectifier bridge network operates as a mixer and consequently the beat frequency of the two voltages developed by generators 10 and 11 also appears in the output circuit. The low-pass filter consisting of resistor 36 and capacitor 42 will minimize or bypass any voltages of frequencies above a predetermined value determined by the filter network. Fig. 2 to which reference is now made, is an equivalent circuit diagram of the bridge network 27, the low-pass filter 42, 36 and the output load schematically indicated by resistor 45 representing the impedance of relay winding 25. Thus, the load resistor 45 and capacitor 42 are connected in parallel. The two alternating current voltages from the generators are impressed on the equivalent circuit of Fig. 2 by input leads 34 and 38. Resistors 46 and 47 connected serially in the respective input leads 38, 34 represent the resistance of two of the rectifiers which are conducting at the particular instant such as rectifiers 33, 31 or 30, 32. It will now be seen that beat frequency waves having a frequency above the upper limit of the low-pass filter 36, 42, will be shunted across the load 45. However, if the beat frequency wave has a frequency within the pass band of the low-pass filter, a voltage will be built up across load 45 and capacitor 42.

Figure 3:
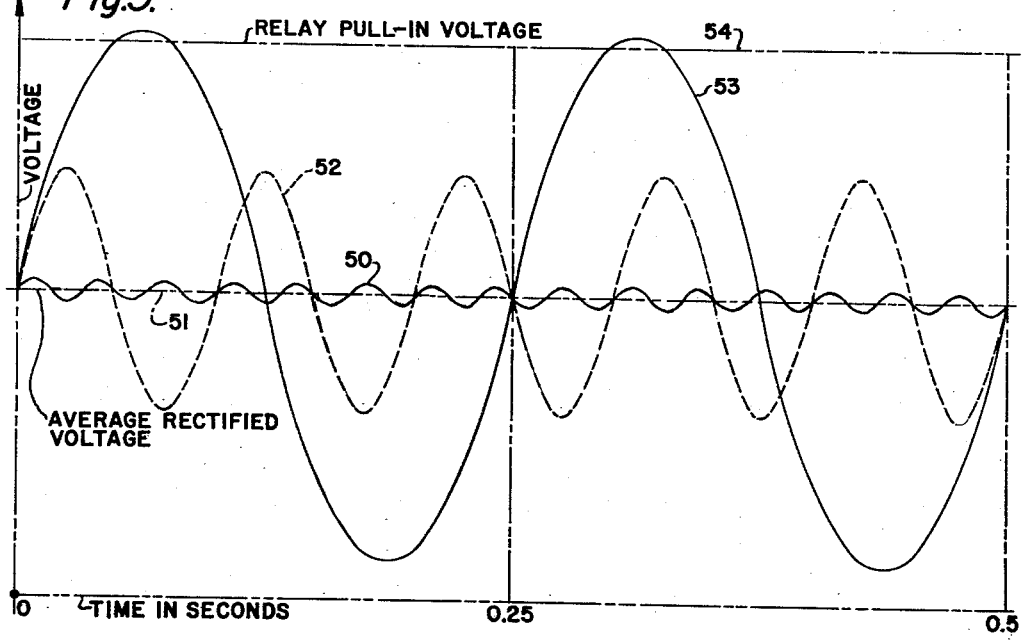
Fig. 3 is a graph of rectified voltages plotted as a function of time and developed across the rectifier bridge circuit of Fig. 1 under various conditions.

The rectified output voltages, which appear between leads 40, 41 and across load 45 representing relay winding 25 are illustrated in Fig. 3, to which reference is now made. Voltage wave 50 may, for example, depict a beat frequency wave of 15 cycles per second (C. P. S.). Broken line 51 indicates the average rectified voltage. When the beat frequency is reduced to 5 C. P. S. a wave such as shown at 52 may exist between the output leads 40, 41. Voltage wave 53 represents a 2 C. P. S. beat frequency wave and it will be seen that its amplitude now exceeds broken line 54 which indicates the relay pull-in voltage. Accordingly, relay winding 25 will be energized slightly ahead of exact phase synchronism, when the beat frequency is less than a predetermined value. Since the relay has a certain amount of mechanical inertia the movable contacts of switches 22, 23 may be made to close at exact phase synchronism. It will be understood that rectifier network 27 may be replaced by a half-wave rectifier network.

Thus, it is assured that the two generators 10, 11 will be paralleled when their voltages are substantially in phase and when the beat frequency of the alternating-current voltage is below a predetermined value determined by the circuit constants of the low-pass filter, that is by the resistance of resistor 36, and by the capacitance of capacitor 42 and by the resistance of relay winding 25. Resistor 36 preferably is adjustable to establish the pass band of the filter network. Since the amplitude of the voltages 50, 52 and 53 cannot exceed the sum of one-half of the peak voltage of each transformer 13 and 17, the amplitudes of the two generator voltages must also exceed a predetermined value before the two generators can be paralleled.

The exact shapes of the voltage waves 50, 52 and 53 illustrated in Fig. 3 are dependent on the relative values of the resistances of resistor 36 and relay winding 25. The impedance which the relay winding 25 presents to the beat frequency wave is essentially resistive. If the resistances are equal the voltage waves will be approximately like those shown in Fig. 3, that is they will have approximately sinusoidal shape. However, if the resistance of resistor 36 is small compared to that of relay winding 25, the voltage waves will be of saw-tooth shape having a comparatively steep rise and slow fall. On the other hand, if the resistance of resistor 36 is large compared to that of relay winding 25, the rectified voltage will again be of saw-tooth shape but will have a relatively slow rise and a steep fall. Preferably the resistances of resistor 36, and relay winding 25 are approximately equal.

Preferably, resistor 36 is provided in the input circuit of bridge network 27. In this case, the voltage applied to the bridge network is reduced by resistor 36 so that rectifiers may be used which are able to withstand a lower voltage. Due to its simplicity, a resistance-capacitance, low-pass filter network is preferred. However, it is also feasible to utilize an inductance-capacitance filter network.

Figure 4:
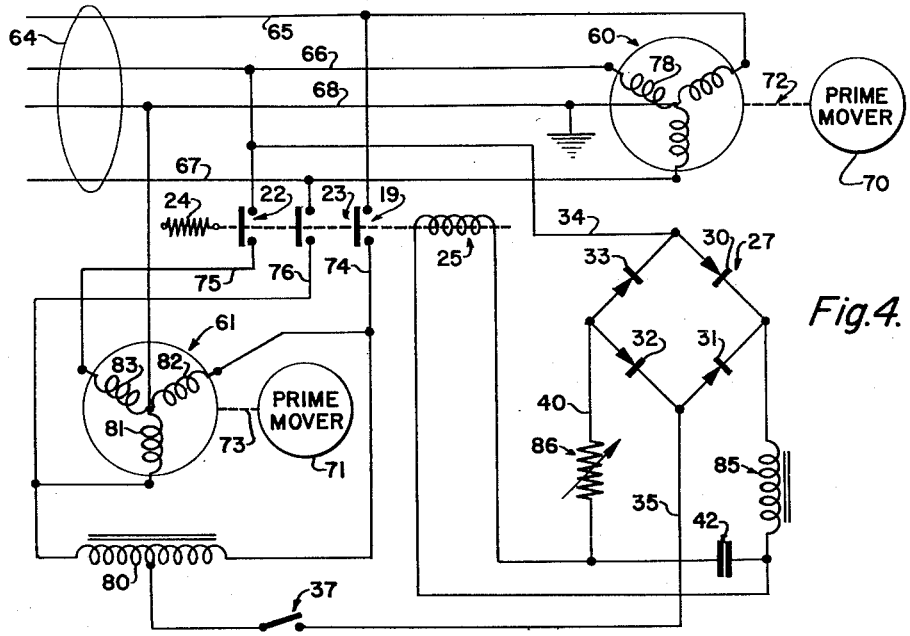
Figs. 4–7 are circuit diagrams of control systems modified in accordance with the invention for paralleling polyphase alternators or alternating current lines.

Such a filter network is illustrated in Fig. 4 to which reference is now made. Fig. 4 illustrates two alternating-current generators 60 and 61 which may be polyphase generators having Y- connected windings. The generator 60 supplies alternating current to a four-wire line 64 including three busses 65, 66 and 67. The common junction point of the Y-connected windings of generator 60 is connected to a conductor 68, which may again be grounded as shown. The two generators 60 and 61 are driven by separate prime movers 70, 71 through appropriate mechanical connections schematically indicated at 72, 73.

The three windings of generator 61 are connected through conductors 74, 75, 76 and the three switches of relay 19 to busses 65, 66, 67, respectively. A lead 77 connects directly the common junction point of the windings of generator 61 to bus 68.

The input circuit of bridge network 27 is connected through lead 34 to bus 66, which, in turn, is connected to winding 78 of generator 60. The other input lead 35 is connected through master switch 37 to the mid-point of an inductor 80. Inductor 80 is, in turn, connected between windings 81, 82 of generator 61. Winding 83 of generator 61 corresponds to winding 78 of generator 60. The voltages of the alternating currents of windings 81 and 82 are respectively 120° and 240° out of phase with respect to the voltage of the alternating current of windings 83 and 78. Hence, the mid-point of inductor 80 develops a voltage which is 180° out of phase (that is, mid-way between 120° and 240°) with respect to the voltage at field windings 83 and 78. Accordingly, the two voltages impressed through input leads 34 and 35 on bridge rectifier 27 are nominally 180° out of phase.

The low-pass filter of the synchronizing system of Fig. 4 now consists of capacitor 42 connected across relay winding 25 and an inductor 85 serially connected in output lead 41. A resistor 86 may be serially connected in output lead 40 for controlling the magnitude of the rectified output voltage.

The control system of Fig. 4 operates in the same manner as does that of Fig. 1. It will be noted that inductor 85 forming part of the low-pass filter is provided in the output circuit of the rectifier bridge, so that the beat frequency voltages are impressed across it.

Figure 5:
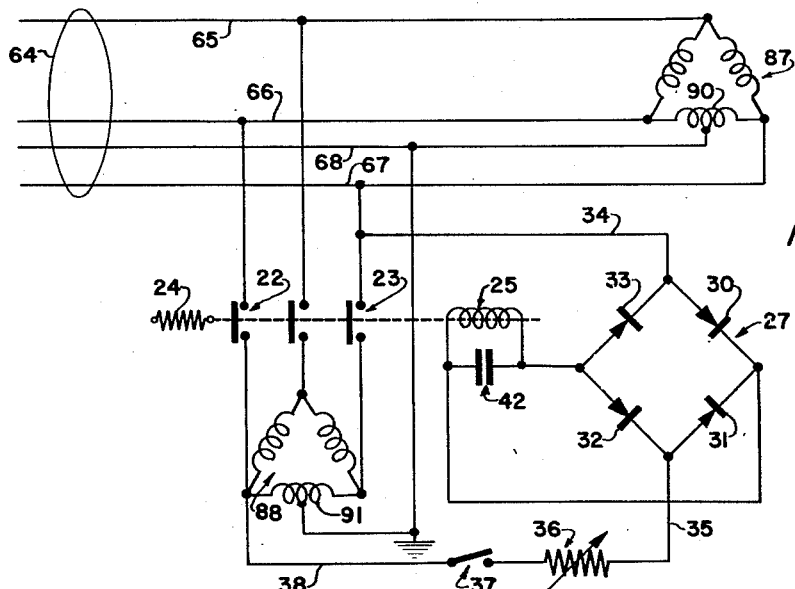

As illustrated in Fig. 5, it is also feasible to parallel a pair of alternating-current generators having delta-connected windings 87 and 88. The two generators again feed a four-wire line 64 and the conductor 68 interconnects the mid-points of the windings 90, 91. Through input lead 34 the bridge network 27 is connected to the right-hand terminal of winding 90 of generator 87. On the other hand, through lead 38, master switch 37, resistor 36 and lead 35, the bridge rectifier network 27 is connected to the left-hand terminal of winding 91 of generator 88. Thus, the bridge network 27 is again supplied with two alternating current voltages which are nominally 180° out of phase due to the common connection between the mid-points of windings 90, 91. The rectifier output circuit is the same as that shown in Fig. 1. The operation of the control system of Fig. 5 is identical with that of the system of Fig. 1.

Figure 6:
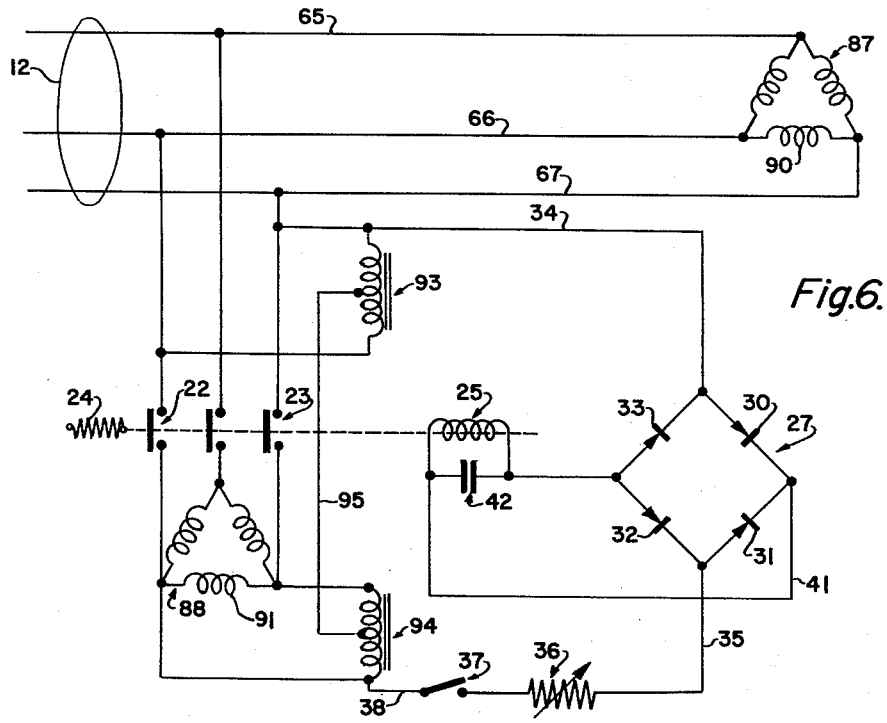
Figure 7:
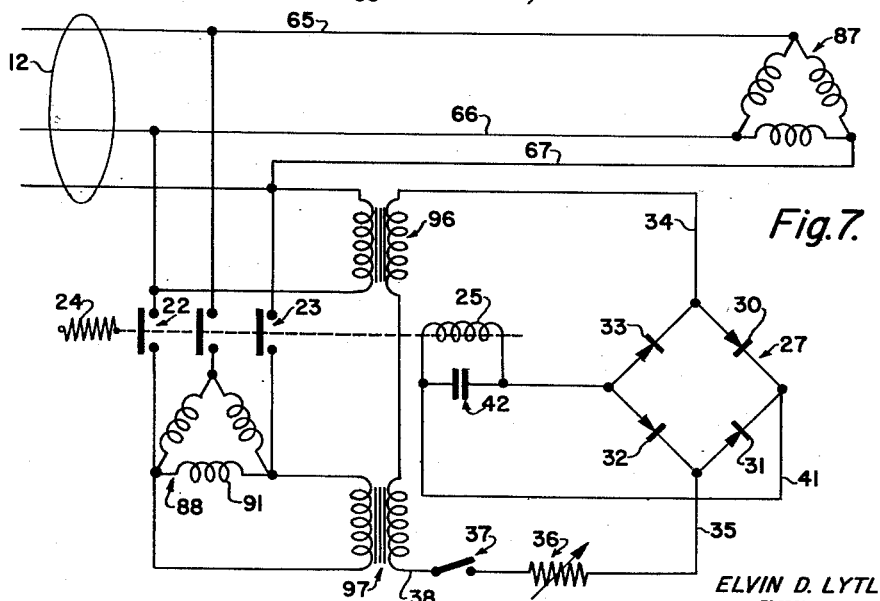

Figs. 6 and 7 also show two delta-connected alternating-current generators 87 and 88. The bridge rectifier network 27 of the systems of both Figs. 6 and 7 has the same output circuit as does that of Fig. 1. Figs. 6 and 7 illustrate different manners of impressing two alternating current voltages from the two generators, which voltages are nominally 180° out of phase, on the bridge network.

In accordance with Fig. 6 an inductor 93 is connected across busses 66, 67 which, in turn, are connected to the terminals of winding 90. Another inductor 94 is connected across the terminals of winding 91. It will be noted that the line 12 is a three-wire line and there is no need of interconnecting the mid-points of one of the windings of the two generators 87, 88. Instead, the mid-points of inductors 93, 94 are interconnected by a lead 95. The leads 34 and 38 of the rectifier input circuit are now connected to opposite terminals of inductors 93 and 94 to obtain two voltages which are nominally 180° out of phase.

Fig. 7 illustrates still another method of obtaining two voltages from the two generators 87, 88 which are nominally 180° out of phase. Two transformers 96 and 97 have their primary windings connected across generator windings 90 and 91, respectively. The transformer secondaries are connected in series with leads 34 and 38 of the bridge network input circuit. Again the two voltages impressed on the bridge network are nominally 180° out of phase. Transformers 96, 97 may be utilized to step down the generator voltages before they are applied to bridge network 27.

It will be understood that the inductance-capacitance filter network of Fig. 4 may be substituted for the resistance-capacitance network of Figs. 1 and 5–7 or that any other suitable low-pass filter network may be substituted therefor.

There has thus been disclosed a control system for automatically paralleling two single-phase or poly-phase alternating-current sources. The control system of the invention is very simple, inexpensive and lightweight. It neither requires vacuum tubes nor interlocking relays. It is particularly adapted for use in connection with aircraft electrical systems where weight is of prime importance.

What is claimed is:

1. A system for paralleling two alternating current sources, comprising: switch means for connecting said sources; and means for effecting closure of said switch means when said sources become substantially synchronized, including a pair of connections to said sources providing a voltage thereacross before and after closure of said switch means, a filter network, and apparatus coupling said pair of connections with said filter network, said apparatus including a mixer for mixing the voltages from said pair of connections, and circuit means for impressing the resultant of said mixed voltages on said filter network, whereby said network will have an output voltage, the amplitude of which is a measure of the approach to synchronization of said sources, said output voltage being available to effect closure of said switch means.

2. A system for paralleling two alternating current sources, comprising: switch means for connecting said sources; and means for effecting closure of said switch means when said sources become substantially synchronized, including a pair of connections to said sources providing a voltage thereacross before and after closure of said switch means, a filter network, and a mixer coupling said pair of connections with said filter network for mixing the voltages from said pair of connections and for impressing the resultant of said mixed voltages on said filter network, whereby said network will have an output voltage, the amplitude of which is a measure of the approach to synchronization of said sources, said output voltage being available to effect closure of said switch means.

3. A system for paralleling two alternating current sources comprising: switch means for connecting said two sources; and means for initiating closing of said switch means including a rectifier network having an input circuit and an output circuit, means coupled to said sources for applying to said input circuit an alternating current voltage from each of said sources, said voltages being nominally 180° out of phase, low-pass filter network coupled to said rectifier network, and circuit means coupling said output circuit to said switch means for closing said switch means to parallel said sources in response to said voltages being substantially 180° out of phase, in response to the combined amplitudes of said voltages exceeding a predetermined value, and in response to the beat frequency of said voltages being less than a predetermined value determined by said filter network.

4. A system for paralleling two alternating current sources comprising: switch means for connecting said two sources; and means for initiating closing of said switch means including a full wave rectifier bridge network having an input circuit and an output circuit, means coupled to said sources for applying to said input circuit an alternating current voltage from each of said sources, said voltages being nominally 180° out of phase, a low-pass resistance-capacitance filter network coupled to said bridge network, and circuit means coupling said output circuit to said switch means for closing said switch means to parallel said sources in response to said voltages being substantially 180° out of phase, in response to the combined amplitudes of said voltages exceeding a predetermined value, and in response to the beat frequency of said voltages being less than a predetermined value determined by said filter network.

5. A system for paralleling two alternating current sources comprising: an electromagnetic relay having a winding and having switches for connecting said two sources; and means for initiating closing of said switches including a full wave rectifier bridge network having an input circuit and an output circuit, means coupled to said sources for applying to said input circuit an alternating current voltage from each of said sources, said voltages being nominally 180° out of phase, a low-pass filter network coupled to said bridge network, and circuit means coupling said output circuit to said winding for energizing said relay to close said switches, thereby to parallel said sources in response to said voltages being substantially 180° out of phase, in response to the combined amplitudes of said voltages exceeding a predetermined value, and in response to the beat frequency of said voltages being less than a predetermined value determined by said filter network.

6. A system for paralleling two alternating current sources comprising: an electromagnetic relay including a winding for connecting said two sources; and means for automatically energizing said relay including a rectifier network having an input circuit and an output circuit, means coupled to said sources for applying to said input circuit an alternating current voltage from each of said sources, said voltages being nominally 180° out of phase, circuit means connecting said output circuit to said winding, a resistor serially connected in said input circuit, and a capacitor connected across said winding, said resistor and capacitor forming a low-pass filter network, whereby said relay is energized to parallel said sources in response to said voltages being substantially 180° out of phase, in response to the combined amplitudes of said voltages exceeding a predetermined value, and in response to the beat frequency of said voltages being less than a predetermined value determined by said filter network.

7. A system for paralleling two alternating current sources comprising: an electromagnetic relay including a winding for connecting said two sources; and means for automatically energizing said relay including a full wave rectifier bridge network having an input circuit and an output circuit, means coupled to said sources for applying to said input circuit an alternating current voltage from each of said sources, said voltages being nominally 180° out of phase, circuit means coupling said output circuit to said winding, a capacitor connected across said winding, and an inductor serially connected in said output circuit, said capacitor and inductor forming a low-pass filter network, whereby said relay is energized to parallel said sources in response to said voltages being substantially 180° out of phase, in response to the combined amplitudes of said voltages exceeding a predetermined value, and in response to the beat frequency of said voltages being less than a predetermined value determined by said filter network.

8. A system as defined in claim 7 wherein a resistor is serially connected in said output circuit, the resistance of said resistor controlling the voltage applied to said winding.

9. A system for paralleling two polyphase alternating current generators, each having three Y-connected windings, said system comprising: switch means for connecting said two generators; and means for initiating closing of said switch means including a full wave rectifier bridge network having an input circuit and an output circuit, a first circuit connection between one of the windings of one of said generators and said input circuit, a second circuit connection between the common junction points of the windings of said generators, an impedance element connected across two windings of the other one of said generators, said two windings carrying current of a phase different from that of said one of the windings, a third circuit connection between the midpoint of said impedance element and said input circuit for applying to said input circuit an alternating current voltage from each of said generators, said voltages being nominally 180° out of phase, a low-pass filter network coupled to said bridge network, and circuit means coupling said output circuit to said switch means for closing said switch means to parallel said sources in response to said voltages being substantially 180° out of phase, in response to the combined amplitudes of said voltages exceeding a predetermined value, and in response to the beat frequency of said voltages being less than a predetermined value determined by said filter network.

10. A system for paralleling two alternating current generators, each having at least one winding, said system comprising: switch means for connecting said two generators; and means for initiating closing of said switch means including a full wave rectifier bridge network having an input circuit and an output circuit, a first circuit connection between the mid-points of corresponding windings of said generators, a second circuit connection between an opposite terminal of each of said corresponding windings and said input circuit for applying to said input circuit an alternating current voltage from each of said generators, said voltages being nominally 180° out of phase, a low-pass filter network coupled to said bridge network, and circuit means coupling said output circuit to said switch means for closing said switch means to parallel said sources in response to said voltages being substantially 180° out of phase, in response to the combined amplitudes of said voltages exceeding a predetermined value, and in response to the beat frequency of said voltages being less than a predetermined value determined by said filter network.

11. A system for paralleling two polyphase alternating current generators, each having three delta-connected windings, said system comprising: switch means for connecting said two generators; and means for initiating closing of said switch means including a full wave rectifier bridge network having an input circuit and an output circuit, a first impedance element connected across one of the windings of one of said generators, a second impedance element connected across the corresponding winding of the other one of said generators, a connection between the mid-points of said impedance elements, means connecting an opposite terminal of each of said impedance elements to said input circuit for applying to said input circuit an alternating current voltage from each of said generators, said voltages being nominally 180° out of phase, a low-pass filter network coupled to said bridge network, and circuit means coupling said output circuit to said switch means for closing said switch means to parallel said sources in response to said voltages being substantially 180° out of phase, in response to the combined amplitudes of said voltages exceeding a predetermined value, and in response to the beat frequency of said voltages being less than a predetermined value determined by said filter network.

12. A system for paralleling two polyphase alternating current generators, each having three delta-connected windings, said system comprising: switch means for connecting said two generators; and means for initiating closing of said switch means including a full wave rectifier bridge network having an input circuit and an output circuit, a first transformer having a primary winding connected across one of the windings of one of said generators, a second transformer having a primary winding connected across the corresponding winding of the other one of said generators, circuit means connecting the secondary windings of said transformers in series with said input circuit for applying to said input circuit an alternating current voltage from each of said generators, said voltages being nominally 180° out of phase, a low-pass filter network coupled to said bridge network, and circuit means coupling said output circuit to said switch means for closing said switch means to parallel said sources in response to said voltages being substantially 180° out of phase, in response to the combined amplitudes of said voltages exceeding a predetermined value, and in response to the beat frequency of said voltages being less than a predetermined value determined by said filter network.

No references cited.